US011883851B1

(12) United States Patent
Bray et al.

(10) Patent No.: US 11,883,851 B1
(45) Date of Patent: Jan. 30, 2024

(54) AUTOMATED SECURING AND RELEASING OF ITEMS ON SHUTTLES

(71) Applicant: Amazon Technologies, Inc., Seattle, WA (US)

(72) Inventors: Michael Alan Bray, Elkhorn, NE (US); Ganesh Krishnamoorthy, Seattle, WA (US); Vivek S. Narayanan, Franklin, TN (US); Daniel Lais, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/741,075

(22) Filed: May 10, 2022

(51) Int. Cl.
| | |
|---|---|
| *B07C 3/08* | (2006.01) |
| *B65G 23/18* | (2006.01) |
| *B65G 21/20* | (2006.01) |
| *B07C 5/36* | (2006.01) |
| *B65G 54/02* | (2006.01) |
| *B65G 41/02* | (2006.01) |
| *B65G 47/88* | (2006.01) |
| *B25J 5/02* | (2006.01) |
| *B60P 1/38* | (2006.01) |
| *B25J 5/00* | (2006.01) |

(52) U.S. Cl.
CPC ............. *B07C 3/082* (2013.01); *B07C 5/362* (2013.01); *B25J 5/02* (2013.01); *B60P 1/38* (2013.01); *B65G 21/2018* (2013.01); *B65G 21/2045* (2013.01); *B65G 23/18* (2013.01); *B65G 41/02* (2013.01); *B65G 47/8823* (2013.01); *B65G 47/8876* (2013.01); *B65G 54/02* (2013.01); *B25J 5/007* (2013.01); *B65G 2201/0258* (2013.01)

(58) Field of Classification Search
CPC .. B07C 3/082; B07C 5/362; B25J 5/02; B25J 5/007; B60P 1/38; B65G 21/2018; B65G 21/2045; B65G 23/18; B65G 41/02; B65G 47/8823; B65G 47/8876; B65G 54/02; B65G 2201/0258
See application file for complete search history.

(56) References Cited

U.S. PATENT DOCUMENTS

| | | | | |
|---|---|---|---|---|
| 4,638,756 | A * | 1/1987 | Collmann | .......... B65G 47/8823 |
| | | | | 118/232 |
| 9,637,318 | B2 * | 5/2017 | Messina | ................. B65G 37/00 |
| 10,889,441 | B1 * | 1/2021 | Pajevic | ................... B60P 1/649 |

(Continued)

*Primary Examiner* — Mark A Deuble
(74) *Attorney, Agent, or Firm* — Eversheds Sutherland (US) LLP

(57) ABSTRACT

Systems, methods, and apparatuses are disclosed for automated securing and releasing of items on shuttles. In one embodiment, an example item sortation system may include a shuttle having a conveyor, a first gate portion having a second width that is about half a first width of the conveyor, a second gate portion having the second width, an optional third gate portion having the second width, and an optional fourth gate portion having the second width, wherein the third gate portion and the fourth gate portion are disposed at a second side of the conveyor. The first gate portion, the second gate portion, the third gate portion, and the fourth gate portion may be configured to: (i) secure the at least one item on the conveyor during transport, and (ii) guide the at least one item along the conveyor when the item is unloaded.

20 Claims, 10 Drawing Sheets

(56) References Cited

U.S. PATENT DOCUMENTS

| | | | |
|---|---|---|---|
| 11,034,524 B2* | 6/2021 | Diehr | B65G 41/003 |
| 2012/0181145 A1* | 7/2012 | Rogers | B65G 47/8861 |
| | | | 198/367.1 |
| 2018/0072212 A1* | 3/2018 | Alfaro | B60K 7/0007 |
| 2019/0092570 A1* | 3/2019 | Macdonald | G05B 19/41895 |
| 2020/0385217 A1* | 12/2020 | Biro | B65G 23/04 |
| 2021/0362968 A1* | 11/2021 | Wagner | B65G 67/02 |
| 2022/0297951 A1* | 9/2022 | Dunten | B60P 1/52 |

* cited by examiner

AUTOMATED SECURING AND RELEASING OF ITEMS ON SHUTTLES

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, improvements in various operations of order fulfillment, such as improvements to picking technology, sorting technology, packing technology, and so forth may be desired, such that manual efforts can be redirected to different tasks.

Figure 1:
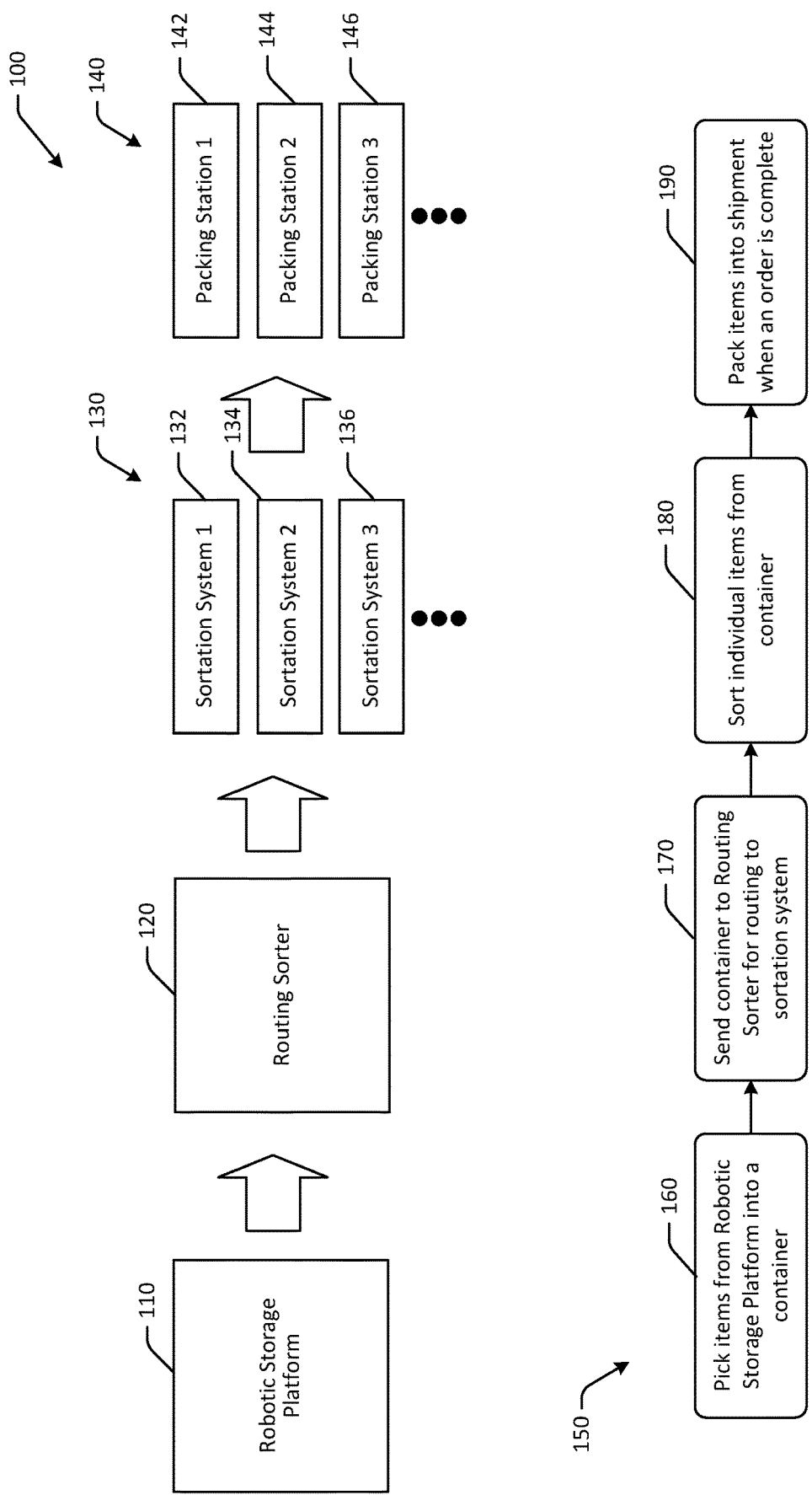
FIG. 1 is a hybrid schematic illustration of an example use case for automated securing and releasing of items on shuttles and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. In some instances, products may be placed directly onto shuttles for transport, without the use of a separate tote or container. Products in the same order may be directed to the same packing location for consolidation and subsequent packing. However, if a shuttle (or a tote or other container) includes products that are to be sorted to multiple different packing locations, the sortation process may be slowed by sheer volume of products that are to be processed and/or sorted.

During handling of items, items may be aggregated and transported directly on shuttles, instead of being transported in containers such as totes. For example, a shuttle may be loaded with one or more items and routed to various destinations in a facility. At different points in the facility, the shuttle may be unloaded. Such unloading may be done automatically, as described herein. For example, a shuttle may have a gate or door, or other securing mechanism, that may be closed to secure one or more items on the shuttle, and may be opened to release items on the shuttle. Shuttles may include conveyors to unload items from the shuttle and/or to reposition items on the shuttle.

Embodiments of the disclosure include automated securing and releasing of items on shuttles that allow for automated unloading of containers while minimizing a risk of damage to items and increasing throughput due to elimination of separate containers during container transport. Unlike systems that use containers to transport items on shuttles (e.g., the container is loaded onto and unloaded off the shuttle, etc.), embodiments of the disclosure may be configured to automatically secure and release items directly on a surface of the shuttle, such as a conveyor surface. Embodiments may include one or more components to prevent items from falling off the shuttle or otherwise becoming unsecure during shuttle transport. Embodiments may be configured to offset axial and lateral accelerations imparted on items loaded on the shuttle. The systems and methods described herein may therefore allow for elimination of containers for item transport, along with corresponding processes and equipment related to container management.

Referring to FIG. 1, an example use case 100 for automated securing and releasing of items on shuttles and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed directly onto a shuttle in some embodiments. In other embodiments, items may be placed into containers that are unloaded at one or more stages or locations at the facility, where unloaded items can then be loaded directly onto shuttles configured to automatically secure and release items as described herein.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, shuttles, certain functions, certain geographic regions, and so forth. The sortation systems may be used to consolidate or otherwise aggregate products for single or multi-item orders. For example, where applicable, a first tote may include a first item of a multi-item order, and a second tote may include a second item of the multi-item order. The sortation system may therefore identify the orders associated with the respective products in a tote, and may transport the products to a container, such as a bin, associated with the order using the shuttles described herein. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete. Automated securing and releasing of items on shuttles as described herein may be used with any of the systems described with respect to FIG. 1.

Figure 2:
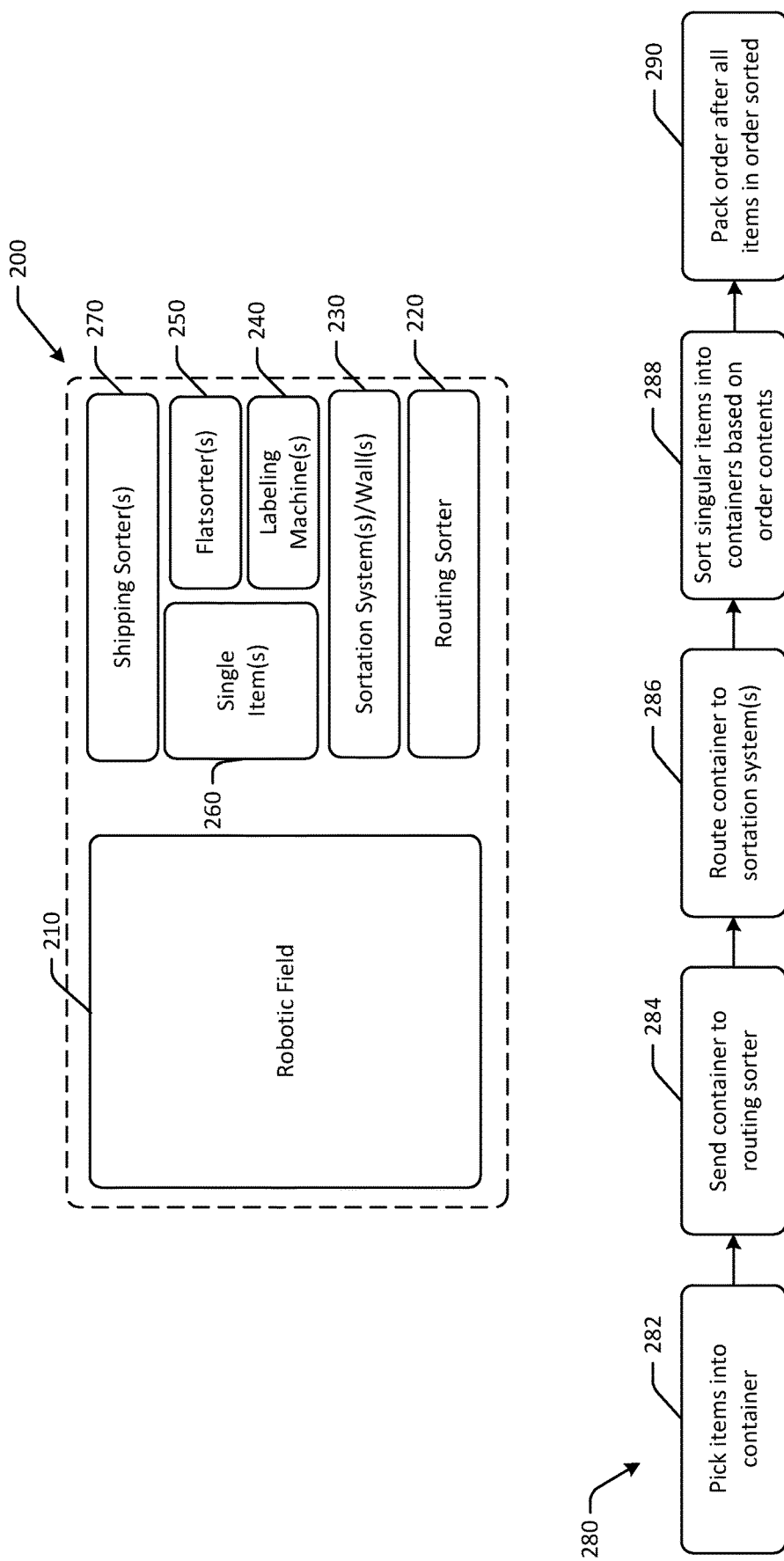
FIG. 2 is a hybrid schematic illustration of an example use case for automated securing and releasing of items on shuttles and an example process flow in accordance with one or more embodiments of the disclosure.

FIG. 2 is a hybrid schematic illustration of an example use case for automated securing and releasing of items on shuttles and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 280 for processing single or multi-item orders. At a first block 282, items for different orders may be optionally picked into a tote or container (or a shuttle) that may be sent to a sorting machine, such as one of the sortation systems 230. The tote or shuttle may include items from any order that is being consolidated by the specific sortation system machine. The sortation system may sort singular items into single or multi-item orders. At a second block 284, the tote may optionally be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents using shuttles as described herein. For example, the containers at the sortation system may be assigned to a particular order that may be single or multi-item. At a fifth block 290, the order may be packed after all items in the order are sorted.

The sortation system machines 220 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be sortation systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers, packages addressed to consumer addresses, and so forth.

Accordingly, sortation systems may be arranged in rows and may receive shuttles or totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include automated securing and releasing of items on shuttles that can be used to transport items between an induction portion and a delivery destination container of a sortation system, and/or at other locations or processed throughout a fulfillment center. Certain embodiments may improve processing speed and/or throughput of fulfillment centers. Certain embodiments may improve performance of mechanical equipment for sortation and/or consolidation of items for single or multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3A:
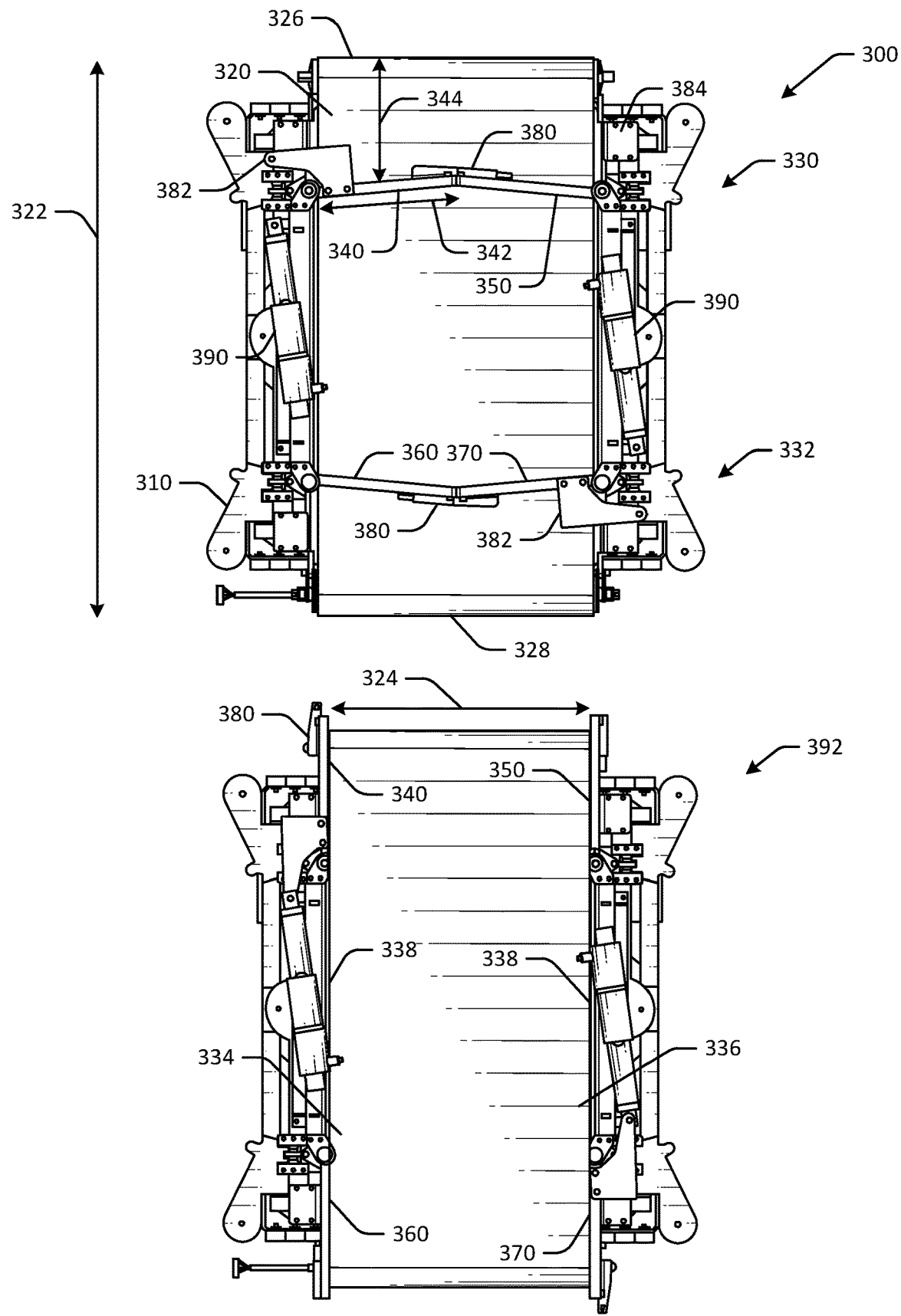
FIGS. 3A-3C are schematic illustrations of a shuttle configured to secure and release items automatically in accordance with one or more embodiments of the disclosure.
Figure 3B:
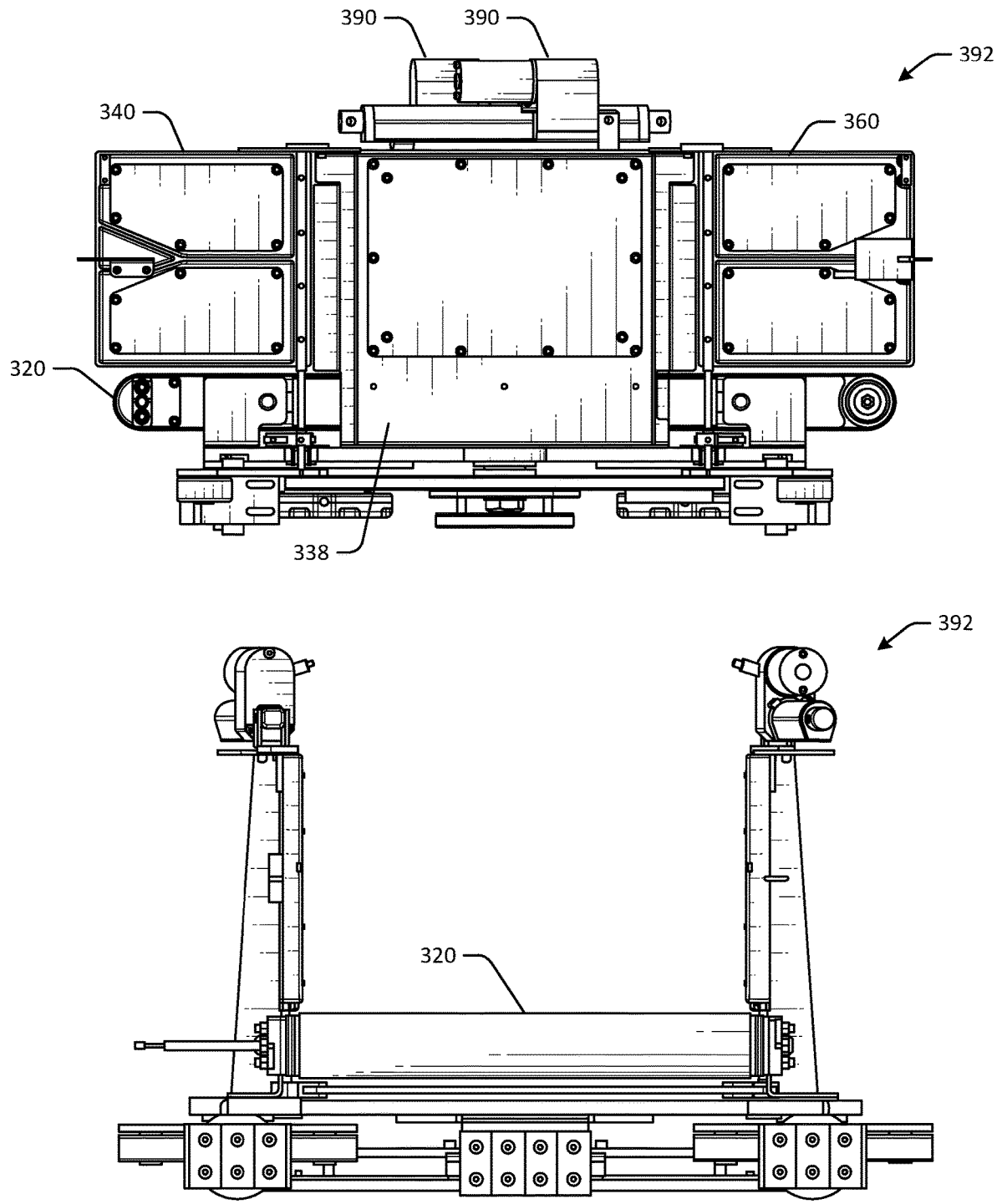
Figure 3C:
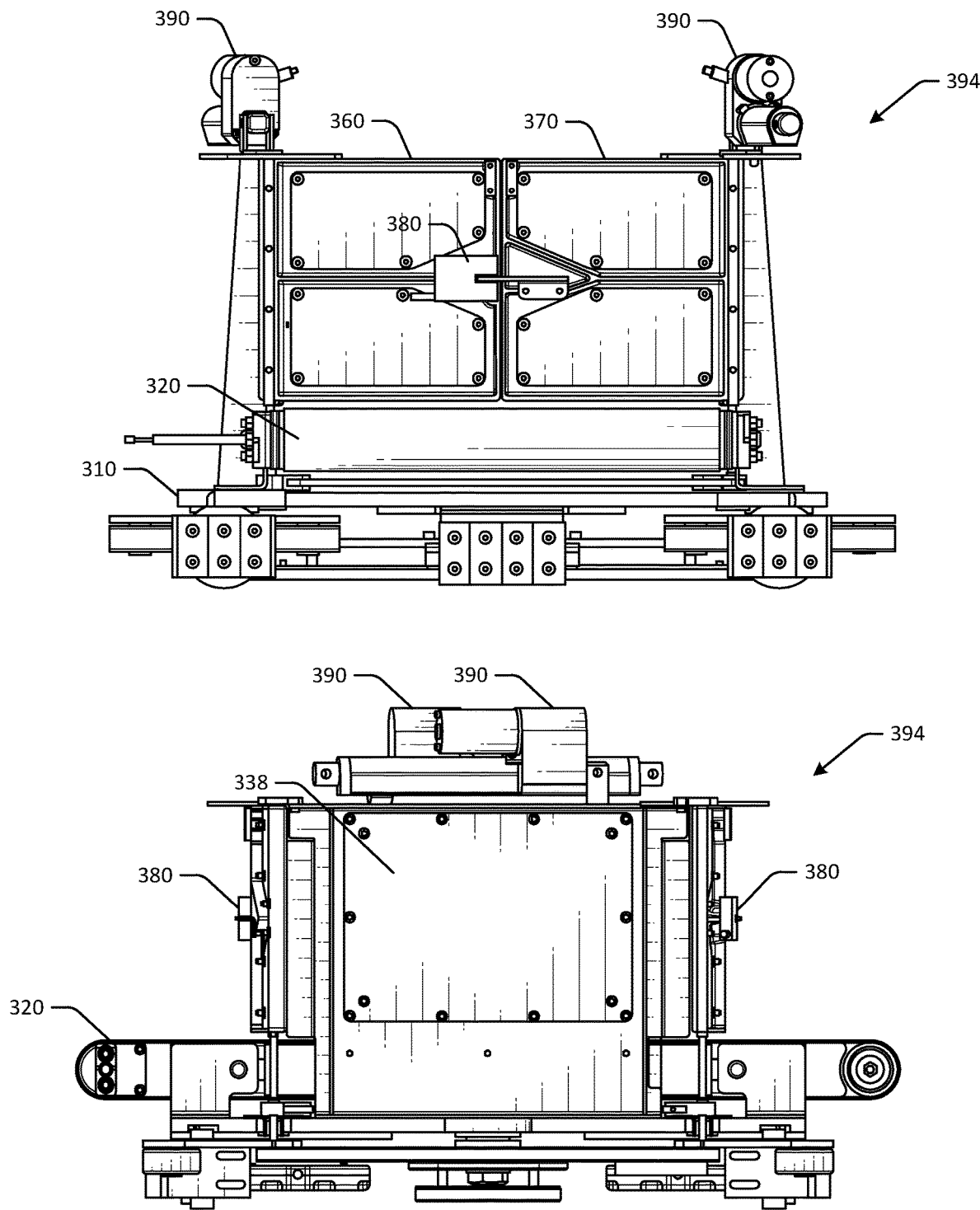

FIGS. 3A-3C are schematic illustrations of a shuttle 300 configured to secure and release items automatically in accordance with one or more embodiments of the disclosure. Other embodiments may include additional or fewer components. The illustration of FIGS. 3A-3C are not to scale, and may not be illustrated to scale with respect to other figures. The shuttle system illustrated in FIGS. 3A-3C may be the same shuttle system discussed with respect to FIGS. 1-2.

In FIG. 3A, the shuttle 300 may be configured to automatically secure and release a payload, such as one or more items without the use of a container for the items. For example, the shuttle 300 may include one or more gate portions that can be used to secure item(s) on a portion of a conveyor 320 that is onboard the shuttle. When unloading the item(s), the gate portions may open to allow the conveyor to convey the item(s) off the shuttle 300 and onto another surface. When in an open configuration, the gate portions may form guiderails along sides of the conveyor 320, so as to prevent the item(s) from falling off the conveyor 320 during unloading. For example, round or cylindrical items may roll during conveyor movement, and the gate portions may prevent the items from falling off a side of the shuttle 300 or conveyor 320.

In some embodiments, the shuttle 300 may be configured to move along a track, such as a track that is part of an item sortation system. The item sortation system may include a set of one or more electromagnets disposed along the track, where the shuttle has a permanent magnet coupled to a lower surface of the shuttle, and the permanent magnet is configured to engage with the set of electromagnets to propel the shuttle. Accordingly, the shuttle may be configured to transport items from an induction portion of the item sortation system to a destination container, where the items may be unloaded from the shuttle into the destination container. Other embodiments may move along a track between sortation systems and/or other components of a facility.

The shuttle 300 may include a base 310 to which the permanent magnet may be coupled. The conveyor 320 may be disposed on the base 310. The conveyor 320 may have a first length 322 and a first width 324. For example, the first length 322 may be about 34 inches, such as between about 30 inches and about 40 inches, and the first width 324 may be about 18 inches, such as between about 15 inches and about 22 inches. The conveyor 320 may be a bi-directional conveyor that is configured to support at least one item, and may be configured to rotate in forward and reverse directions. The conveyor 320 may have a first side 330 and a second side 332. The conveyor 320 may have a first edge 334 and a second edge 336. The conveyor 320 may have a first end 326 and a second end 328, where items can roll off the respective ends and onto another surface and/or into a container. In other embodiments, the conveyor 320 may be a unidirectional conveyor, and the shuttle 300 may therefore include one set of gate portions disposed on one side of the conveyor, and three fixed sidewalls.

The shuttle 300 may include one or more gate portions. The gate portions may be configured to secure at least one item on the conveyor 320 during transport (e.g., when the shuttle 320 is in movement, etc.), and may also be configured to guide the at least one item along the conveyor 320 when the item is unloaded from the shuttle 320. For example, the gate portions may form guiderails along the respective first edge 334 and second edge 336 of the conveyor 320.

In the example of FIGS. 3A-3C, the shuttle 300 may include a first gate portion 340, a second gate portion 350, a third gate portion 360, and a fourth gate portion 370. Other embodiments may have a different number of gate portions. The first gate portion 340 and the second gate portion 350 together may form a gate or door that extends across the first width 324 of the conveyor 320, so as to prevent items from rolling off the conveyor 320. The first gate portion 340 and the second gate portion 350 may therefore be aligned when the first gate portion 340 and the second gate portion 350 are in a closed configuration 394, as depicted in one of the illustrations in FIG. 3A and in the illustrations of FIG. 3C Similarly, the third gate portion 360 and the fourth gate portion 370 together may form a gate or door that extends across the first width 324 of the conveyor 320, so as to prevent items from rolling off the conveyor 320. The third gate portion 360 and the fourth gate portion 370 may therefore be aligned when the third gate portion 360 and the fourth gate portion 370 are in a closed configuration, as depicted in one of the illustrations in FIG. 3A.

In some embodiments, an angle formed between the first gate portion 340 and the second gate portion 350 in the closed position may be less than 180 degrees (e.g., as depicted in FIG. 3A). In other embodiments, the angle may be 180 degrees.

The first gate portion 340 may have a second width 342 that is about half the first width 324. Accordingly, the first gate portion 340 may extend about halfway across the conveyor 320 when the first gate portion 340 is in a closed configuration. Similarly, the second gate portion 350, the third gate portion 360, and the fourth gate portion 370 may have the second width 342.

The first gate portion 340 may be disposed a distance 344 from the first end 326 of the conveyor 320, where the second width 342 is substantially equal to the distance 344 (e.g., the second width 342 may be the same as the distance 344, or 1-3 inches shorter depending on scale in some embodiments, etc.). The second gate portion 350 may also be positioned the distance 344 from the first end 326. The third gate portion 360 and the fourth gate portion 370 may be positioned the distance 344 from the second end 328 of the conveyor 320.

The first gate portion 340 may be configured to rotate towards the first edge 334 of the conveyor 320, where the first gate portion 340 is substantially aligned with the first edge 334 when in an open configuration 392, as depicted in one of the illustrations in FIG. 3A. Similarly, the second gate portion 350 may be configured to rotate towards the second edge 336 of the conveyor 320 when in the open configuration 392, as the first gate portion 340 and the second gate portion 350 may be disposed at the first side 330 of the conveyor 320. The third gate portion 360 may be configured to rotate towards the first edge 334 of the conveyor 320, where the third gate portion 360 is substantially aligned with the first edge 334 when in the open configuration 392. Similarly, the fourth gate portion 370 may be configured to rotate towards the second edge 336 of the conveyor 320 when in the open configuration 392, as the third gate portion 360 and the fourth gate portion 370 may be disposed at the second side 332 of the conveyor 320.

Accordingly, in the closed configuration 394, the first gate portion 340, the second gate portion 350, the third gate portion 360, and the fourth gate portion 370 may be configured to secure one or more items on the conveyor 320 during transport or when the shuttle 320 is stationary, and in the open configuration 392 may be configured to guide the item(s) along the conveyor 320 when the items are unloaded from the shuttle 320. The first gate portion 340 and the second gate portion 350 may therefore be in a closed position during item transport, and the first gate portion 340 and the second gate portion 350 may be in an open position to form guiderails during item unloading. Similarly, the third gate portion 360 and the fourth gate portion 370 may be in a closed position during item transport, and the third gate portion 360 and the fourth gate portion 370 may be in an open position to form guiderails during item unloading.

The shuttle 300 may include one or more latches to secure gate portions. For example, the shuttle 300 may include a latch 380 configured to secure the first gate portion 340 to the second gate portion 350, and another latch 380 configured to secure the third gate portion 360 to the fourth gate portion 370. The latches may be any suitable coupling mechanism, such as a magnetic latch, a mechanical latch, a mechanical solenoid, or another type of latch. The latch 380 may be configured to secure adjacent gate portions together in a closed position.

To move between the closed configuration 394 to the open configuration 392, one or more actuators 390 may be used to actuate the gate portions. In some embodiments, a single actuator may be used to open all four gate portions simultaneously, as the gate portions may be mechanically linked. For example, the shuttle 300 may include a first actuator configured to actuate the first gate portion 340, the second gate portion 350, the third gate portion 360, and the fourth gate portion 370. The shuttle 300 may include a second actuator configured to actuate the conveyor 320. In such embodiments, the conveyor 320 and the first gate portion 340, the second gate portion 350, the third gate portion 360, and the fourth gate portion 370 may be actuated at a same time (e.g., both the first actuator and the second actuator may be actuated at the same time). In some embodiments, a single actuator may actuate the conveyor and the gate portions at a same time, such as for unidirectional conveyor embodiments.

In an embodiment, such as that illustrated in FIGS. 3A-3C, the shuttle 300 may include one actuator 390 for the first gate portion 340 and the second gate portion 350, and another actuator 380 for the third gate portion 360 and the fourth gate portion 370. The actuators 390 may be coupled to the respective sets of gate portions using linkage 382, where the two gate portions may be linked to each other (e.g., the first gate portion 340 and the second gate portion 350 may be mechanically linked, and the third gate portion 360 and the fourth gate portion 370 may be mechanically linked).

In some embodiments, the shuttle 300 may include one or more optional motors 384, such as belt driven motors, stepper motors, direct drive motors, or other types of motors instead of, or in addition to, the actuator(s) 390, where the motor(s) 384 may impart motion to the gate portions.

As depicted in FIG. 3B, the shuttle 300 may include sidewalls 338 that may support positioning of the actuators 390 thereon, so as to reduce a width of the shuttle 300 and increase retrofitting capability.

The shuttle 300 may include one or more sensors configured to detect that the first gate portion and the second gate portion are in the closed position. The sensor may be integrated with the latch 380. The sensor may be any suitable sensor type, such as a photo eye sensor, a hall effect sensor, a magnetic sensor, a microswitch, a motor encoder, a proximity sensor, or another type of sensor.

In some embodiments, the shuttle 300 may not have an onboard power source coupled to the conveyor 320 or the actuator(s) 390. In such embodiments, the shuttle 300 may receive power from an external source at a delivery location.

Figure 4:
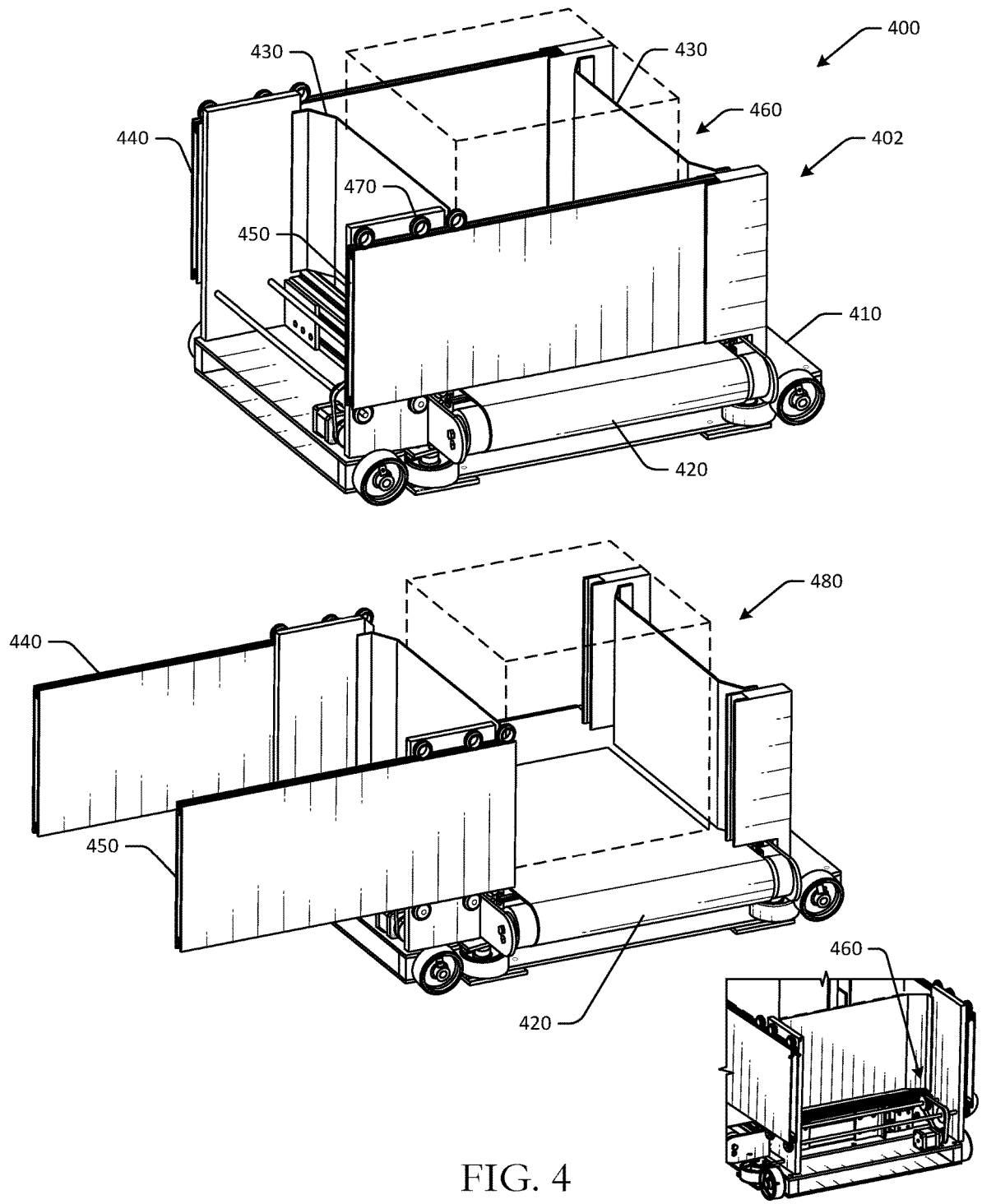
FIG. 4 is a schematic illustration of a shuttle configured to secure and release items automatically in accordance with one or more embodiments of the disclosure.

FIG. 4 is a schematic illustration of a shuttle 400 configured to secure and release items automatically in accordance with one or more embodiments of the disclosure. Other embodiments may include additional or fewer components. The illustration of FIG. 4 is not to scale, and may not be illustrated to scale with respect to other figures. The shuttle system illustrated in FIG. 4 may be the same shuttle system discussed with respect to FIGS. 1-2.

In FIG. 4, the shuttle 400 may be configured to automatically secure and release a payload, such as one or more items without the use of a container for the items. For example, the shuttle 400 may include one or more sliding gate portions that can be used to secure item(s) on a portion of a conveyor 420 that is onboard the shuttle. When unloading the item(s), the sliding gate portions may slide to allow the conveyor 420 to convey the item(s) off the shuttle 400 and onto another surface. When in an open configuration, the shuttle 400 may include fixed sidewalls 430 that form guiderails along sides of the conveyor 420, so as to prevent the item(s) from falling off the conveyor 420 during unloading. For example, round or cylindrical items may roll during conveyor movement, and the fixed sidewalls 430 may prevent the items from falling off a side of the shuttle 400 or conveyor 420.

In some embodiments, the shuttle 400 may be configured to move along a track, such as a track that is part of an item sortation system. The item sortation system may include a set of one or more electromagnets disposed along the track, where the shuttle has a permanent magnet coupled to a lower surface of the shuttle, and the permanent magnet is configured to engage with the set of electromagnets to propel the shuttle. Accordingly, the shuttle may be configured to transport items from an induction portion of the item sortation system to a destination container, where the items may be unloaded from the shuttle into the destination container. Other embodiments may move along a track between sortation systems and/or other components of a facility.

The shuttle 400 may include a base 410 to which the permanent magnet may be coupled. The conveyor 420 may be disposed on the base 410. The conveyor 420 may be a bi-directional conveyor that is configured to support at least one item, and may be configured to rotate in forward and reverse directions.

The shuttle 400 may include a first sliding gate portion 440 and a second sliding gate portion 450 configured to slide from a closed position 402 to an open position 480, where the items can be unloaded when the sliding gate portions are in the open position 480. The first sliding gate portion 440 and the second sliding gate portion 450 may be configured to slide in a direction perpendicular to a central axis of the conveyor 420 (e.g., a direction of movement of the conveyor 420). The first sliding gate portion 440 and the second sliding gate portion 450 may be formed of aluminum extrusion with V-shaped slots that allow the sliding gate portions to slide along respective sets of friction drive wheels 470. The friction drive wheels 470 may be disposed on the top and/or bottom of the sliding gate portions. The sliding gate portions may be driven by one or more motors 460 at the front or back of the shuttle 400. In some embodiments, the sliding gate portions may be coupled to the same motor and always actuate together, or a second motor can be added for individual control. The motor 460 may be a belt driven motor, a stepper motor, or another type of actuator. Some embodiments may include two sliding gate portions per side instead of one sliding gate portion per side as depicted in FIG. 4.

Figure 5:
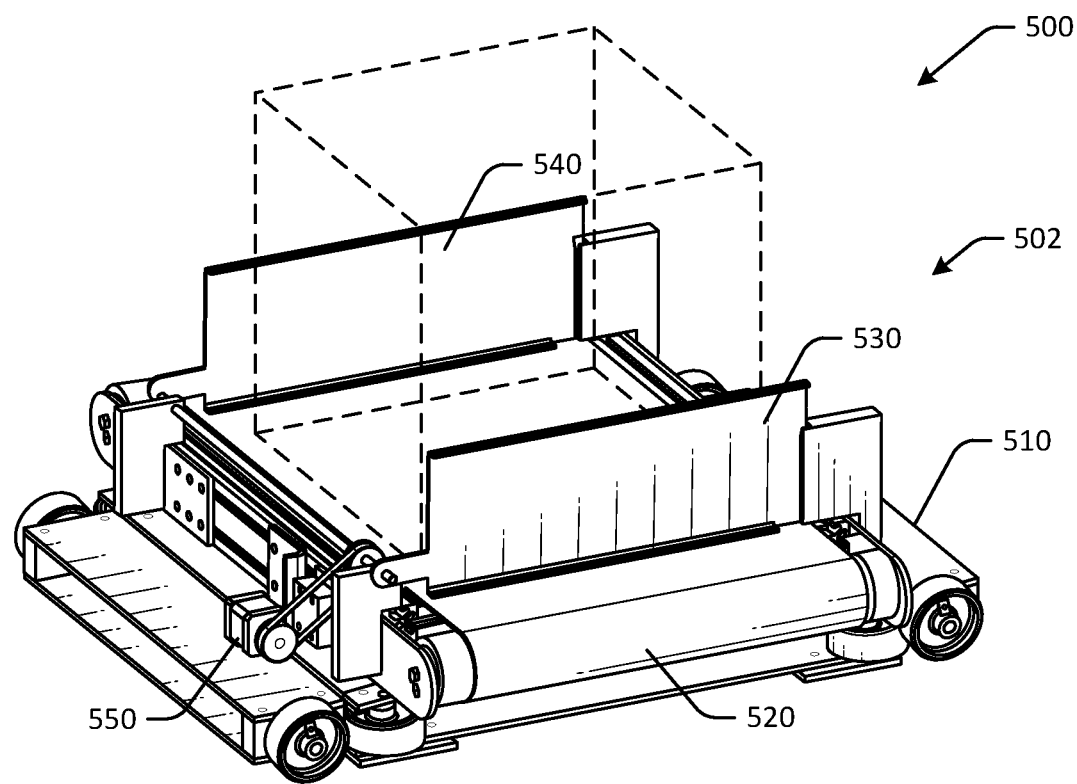
FIG. 5 is a schematic illustration a shuttle configured to secure and release items automatically in accordance with one or more embodiments of the disclosure.
Figure 5:
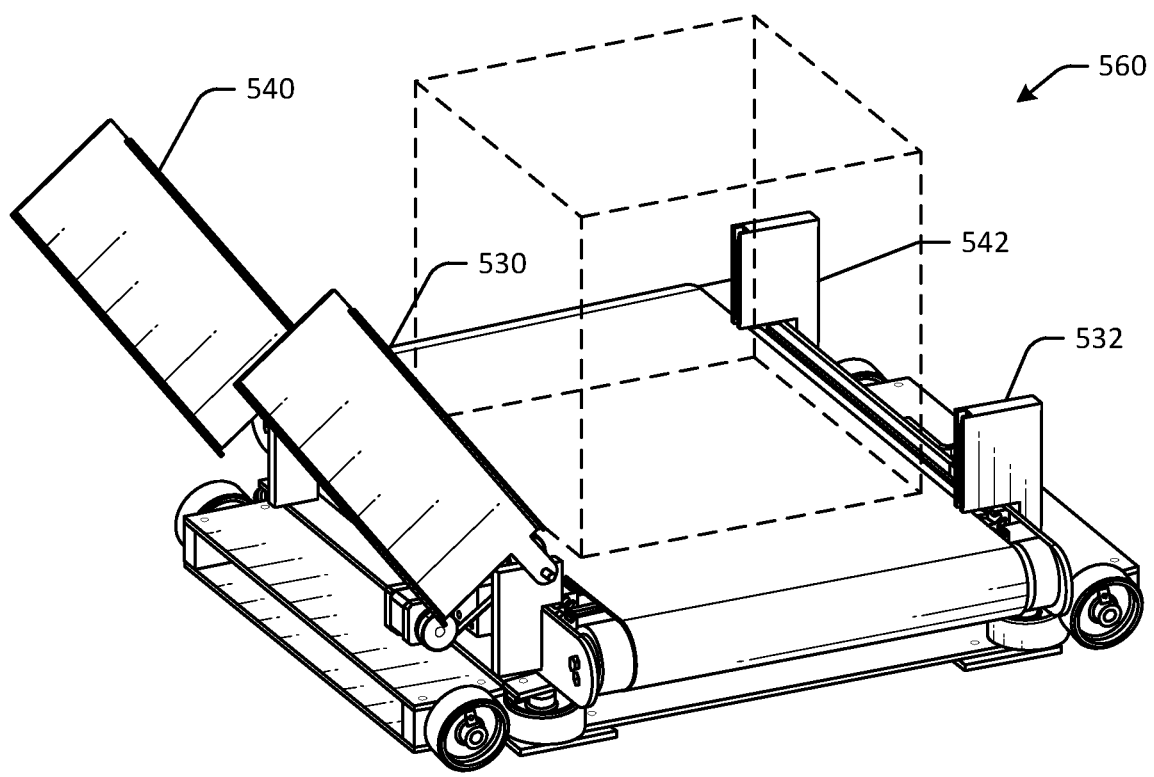

FIG. 5 is a schematic illustration a shuttle 500 configured to secure and release items automatically in accordance with one or more embodiments of the disclosure. Other embodiments may include additional or fewer components. The illustration of FIG. 5 is not to scale, and may not be illustrated to scale with respect to other figures. The shuttle system illustrated in FIG. 5 may be the same shuttle system discussed with respect to FIGS. 1-2.

In FIG. 5, the shuttle 500 may be configured to automatically secure and release a payload, such as one or more items without the use of a container for the items. For example, the shuttle 500 may include one or more rotating gate portions that can be used to secure item(s) on a portion of a conveyor 520 that is onboard the shuttle. When unloading the item(s), the rotating gate portions may rotate to allow the conveyor 520 to convey the item(s) off the shuttle 500 and onto another surface. When in an open configuration 560, the shuttle 500 may include fixed sidewalls or bars that form guiderails along sides of the conveyor 520, so as to prevent the item(s) from falling off the conveyor 520 during unloading. For example, round or cylindrical items may roll during conveyor movement, and the fixed sidewalls or bars may prevent the items from falling off a side of the shuttle 500 or conveyor 520.

In some embodiments, the shuttle 500 may be configured to move along a track, such as a track that is part of an item sortation system. The item sortation system may include a set of one or more electromagnets disposed along the track, where the shuttle has a permanent magnet coupled to a lower surface of the shuttle, and the permanent magnet is configured to engage with the set of electromagnets to propel the shuttle. Accordingly, the shuttle may be configured to transport items from an induction portion of the item sortation system to a destination container, where the items may be unloaded from the shuttle into the destination container. Other embodiments may move along a track between sortation systems and/or other components of a facility.

The shuttle 500 may include a base 510 to which the permanent magnet may be coupled. The conveyor 520 may be disposed on the base 510. The conveyor 520 may be a bi-directional conveyor that is configured to support at least one item, and may be configured to rotate in forward and reverse directions.

The shuttle 500 may include a first rotating gate portion 530 and a second rotating gate portion 540 configured to rotate from a closed position 502 to the open position 560, where the items can be unloaded when the rotating gate portions are in the open position 560. The first rotating gate portion 530 and the second rotating gate portion 540 may be configured to rotate in a direction perpendicular to a central axis of the conveyor 520 (e.g., a direction of movement of the conveyor 520). The first rotating gate portion 530 and the second rotating gate portion 540 may engage with corresponding supports 532, 542 in the closed configuration 502. For example, a first support 532 may have a first groove to receive the first rotating gate portion 530, and the second support 542 may have a second groove to receive the second rotating gate portion 540. The rotating gate portions may be driven by one or more motors 550 at the front or back of the shuttle 500. In some embodiments, the rotating gate portions may be coupled to the same motor and always actuate together, or a second motor can be added for individual control. The motor 550 may be a belt driven motor, a stepper motor, or another type of actuator. Some embodiments may include two rotating gate portions per side instead of one rotating gate portion per side as depicted in FIG. 5.

Figure 6A:
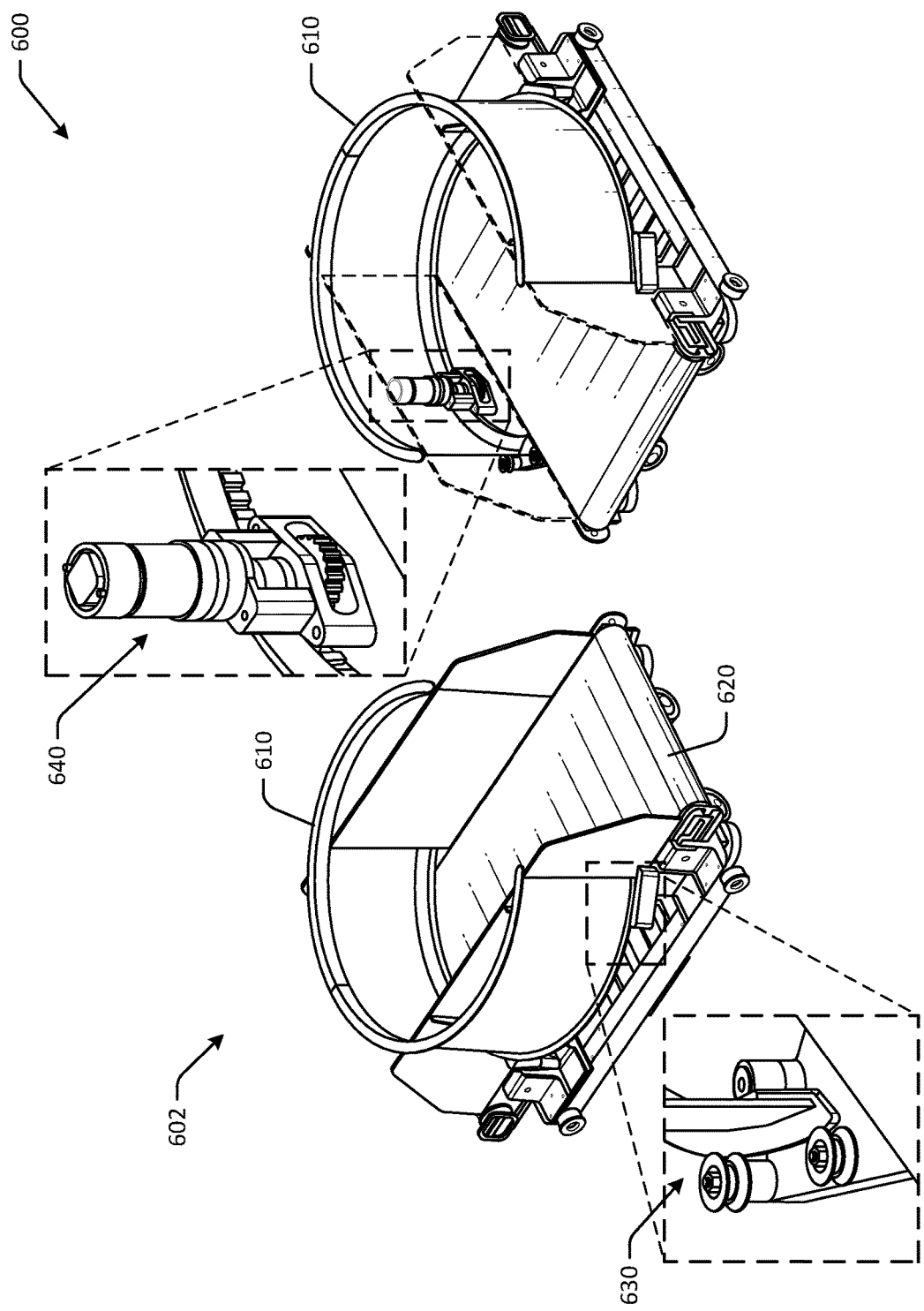
FIGS. 6A-6B are schematic illustrations of a shuttle configured to secure and release items automatically in accordance with one or more embodiments of the disclosure.
Figure 6B:
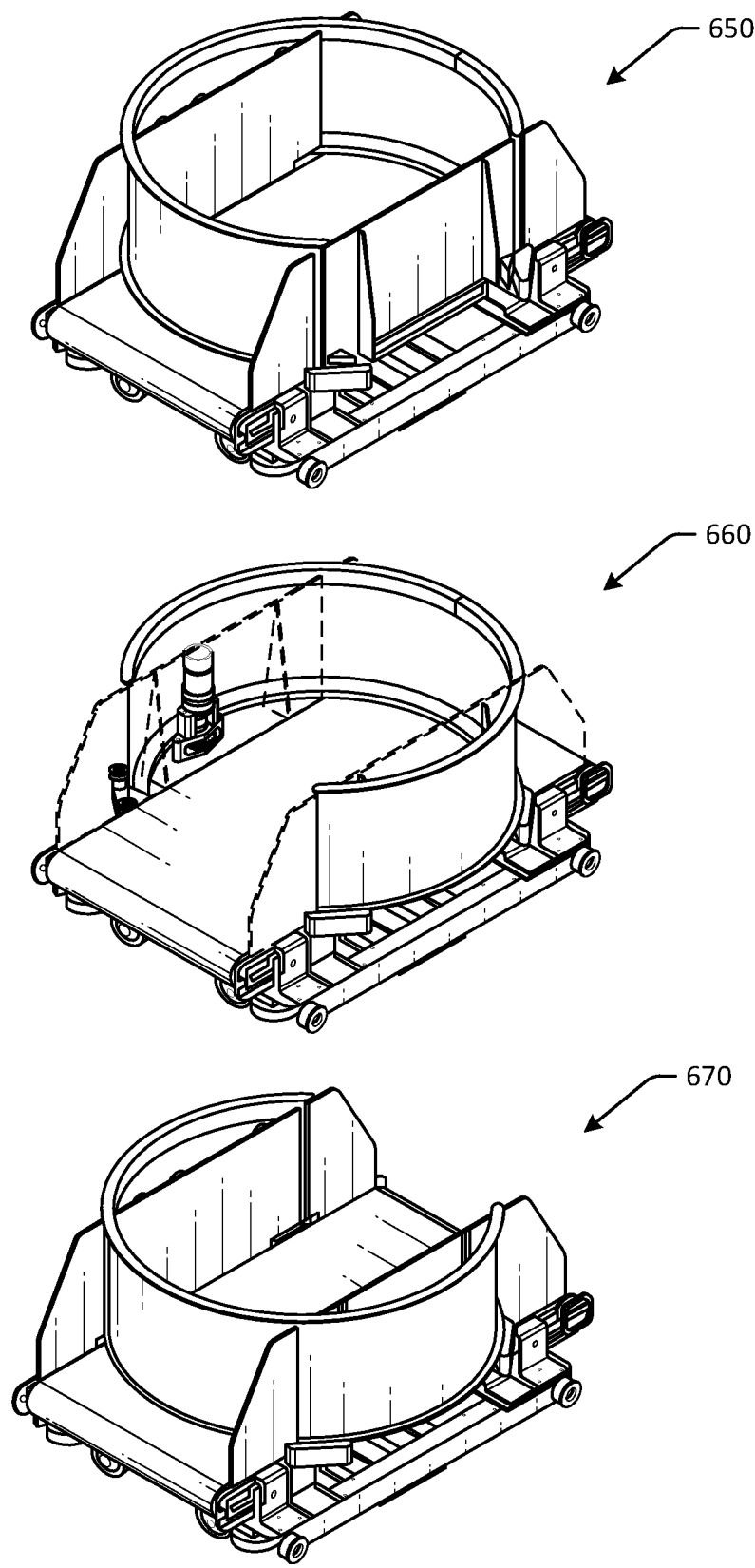

FIGS. 6A-6B are schematic illustrations of a shuttle 600 configured to secure and release items automatically in accordance with one or more embodiments of the disclosure. Other embodiments may include additional or fewer components. The illustration FIGS. 6A-6B are not to scale, and may not be illustrated to scale with respect to other figures. The shuttle system illustrated in FIGS. 6A-6B may be the same shuttle system discussed with respect to FIGS. 1-2.

In FIGS. 6A-6B, the shuttle 600 may be configured to automatically secure and release a payload, such as one or more items without the use of a container for the items. For example, the shuttle 600 may include a C-shaped door 610 that encloses a payload compartment or area on a conveyor 620 on which items are supported, such that the items are secure. To secure the area, the C-shaped door 610 may be rotated to face the open side of the C-shape toward one of the fixed sidewalls. The C-shaped door 610 moves to an open position 602 by rotating the C-shape 90 degrees, such that the open side of the C-shape is in line with the conveyor 620, as depicted in FIG. 6A. The C-shaped door 610 can rotate 90 degrees in either direction from the closed position to allow release of items on the conveyor 620 in both directions. The C-shaped door 610 may be actuated by an actuator 640, such as a motor (e.g., a direct current gear motor running a rack and pinion drive, etc.), or another type of motor. The rim of the C-shaped door 610 may form a track that is supported on an arrangement of cam follower bearings 630.

In some embodiments, the shuttle 600 may be configured to move along a track, such as a track that is part of an item sortation system. The item sortation system may include a set of one or more electromagnets disposed along the track, where the shuttle has a permanent magnet coupled to a lower surface of the shuttle, and the permanent magnet is configured to engage with the set of electromagnets to propel the shuttle. Accordingly, the shuttle may be configured to transport items from an induction portion of the item sortation system to a destination container, where the items may be unloaded from the shuttle into the destination container. Other embodiments may move along a track between sortation systems and/or other components of a facility. The shuttle 600 may include a base to which the permanent magnet may be coupled. The conveyor 620 may be disposed on the base. The conveyor 620 may be a bi-directional conveyor that is configured to support at least one item, and may be configured to rotate in forward and reverse directions.

In FIG. 6B, the shuttle 600 is depicted in a closed configuration 650 with the C-shaped door 610 positioned with its open side aligned with a first sidewall of the shuttle 600. In another closed configuration, the C-shaped door 610 may be positioned with its open side aligned with a second sidewall of the shuttle 600.

The shuttle 600 is depicted in FIG. 6B in a first open configuration 660 with the C-shaped door 610 positioned with its open side aligned with a first side of the conveyor 620 to allow items to be conveyed off a first side of the conveyor, and in a second open configuration 670 with the C-shaped door 610 positioned with its open side aligned with a second side of the conveyor 620 to allow items to be conveyed off a second side of the conveyor. Accordingly, rotation of the C-shaped door 610 may be used to automatically secure and release items transported on the shuttle 600.

One or more operations of the methods, process flows, or use cases of FIGS. 1-6B may have been described above as being performed by a user device, or more specifically, by one or more program module(s), applications, or the like executing on a device. It should be appreciated, however, that any of the operations of the methods, process flows, or use cases of FIGS. 1-6B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6B may be described in the context of the illustrative devices, it should be appreciated that such operations may be implemented in connection with numerous other device configurations.

The operations described and depicted in the illustrative methods, process flows, and use cases of FIGS. 1-6B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
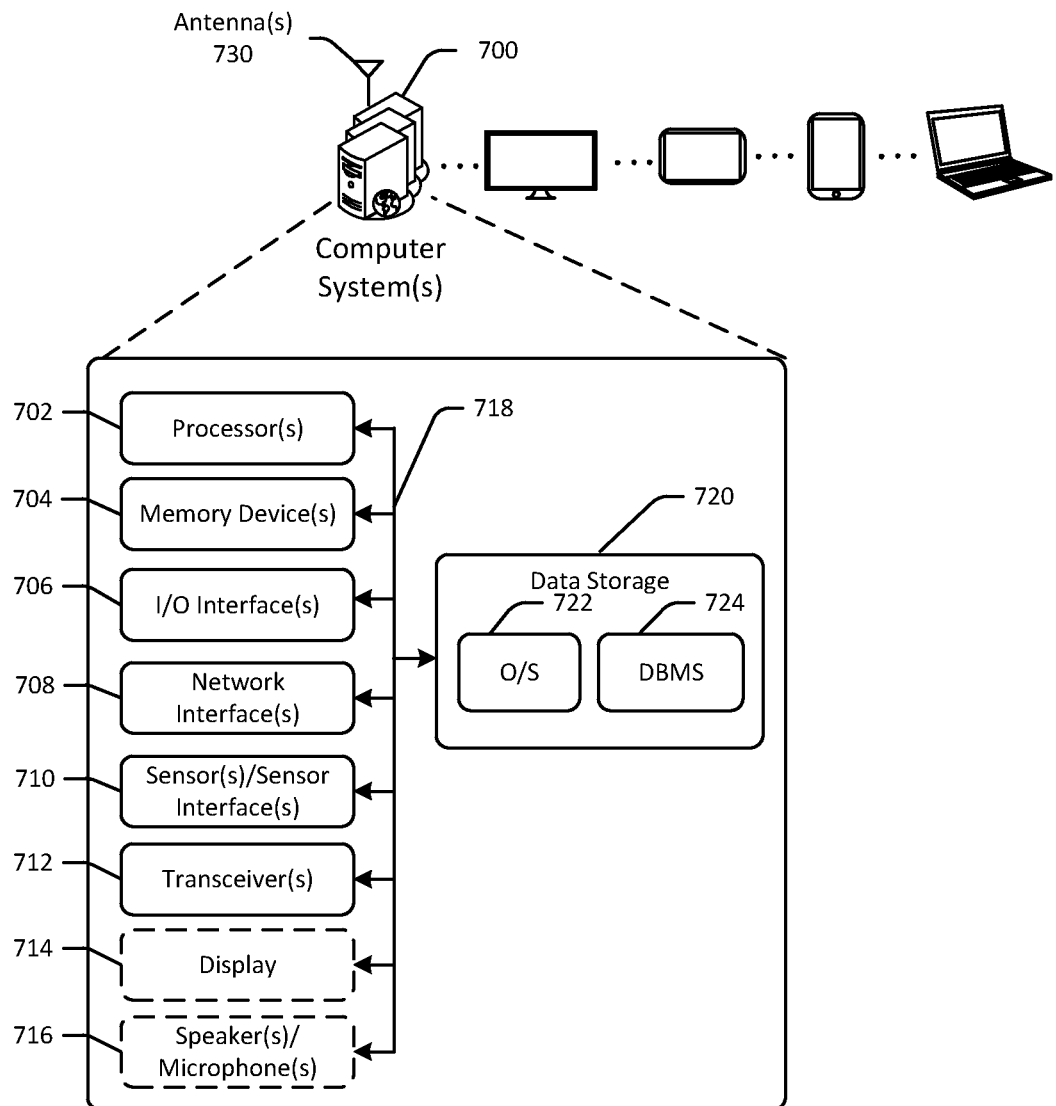
FIG. 7 schematically illustrates an example architecture of a computer system associated with a shuttle in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for a controller(s) or computer system(s) associated with a shuttle system of FIGS. 1-6B.

The computer system(s) 700 may be configured to communicate with one or more servers, user devices, or the like. The computer system(s) 700 may be configured to control shuttle systems, shuttle components, and/or automated module movement systems.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An item sortation system configured to transport items, the item sortation system comprising:
a shuttle configured to move along a track, the shuttle comprising:
a conveyor having a first length and a first width, wherein the conveyor is a bi-directional conveyor that is configured to support at least one item;
a first gate portion having a second width that is about half the first width, the first gate portion configured to rotate towards a first edge of the conveyor;
a second gate portion having the second width, the second gate portion configured to rotate towards a second edge of the conveyor, wherein the first gate portion and the second gate portion are disposed at a first side of the conveyor;
a third gate portion having the second width, the third gate portion configured to rotate towards the first edge of the conveyor; and
a fourth gate portion having the second width, the fourth gate portion configured to rotate towards the second edge of the conveyor, wherein the third gate portion and the fourth gate portion are disposed at a second side of the conveyor;
wherein the first gate portion is positioned a first distance from a first end of the conveyor, and wherein the first distance is substantially equal to the second width; and
wherein the first gate portion, the second gate portion, the third gate portion, and the fourth gate portion are configured to: (i) secure the at least one item on the conveyor during transport, and (ii) guide the at least one item along the conveyor when the item is unloaded.

2. The item sortation system of claim 1, wherein the shuttle further comprises:
a first actuator configured to actuate the first gate portion, the second gate portion, the third gate portion, and the fourth gate portion; and
a second actuator configured to actuate the conveyor;
wherein the conveyor and the first gate portion, the second gate portion, the third gate portion, and the fourth gate portion are actuated at a same time.

3. The item sortation system of claim 2, wherein the shuttle does not comprise an onboard power source coupled to the conveyor, the first actuator, and the second actuator.

4. The item sortation system of claim 1, wherein the system is configured to use electromagnetic force to propel the shuttle.

5. A shuttle comprising:
a conveyor having a first length and a first width, wherein the conveyor is configured to support at least one item;
a first gate portion having a second width that is about half the first width, the first gate portion configured to rotate towards a first edge of the conveyor; and
a second gate portion having the second width, the second gate portion configured to rotate towards a second edge of the conveyor, wherein the first gate portion and the second gate portion are disposed at a first side of the conveyor;
wherein the first gate portion and the second gate portion are configured to: (i) secure the at least one item on the conveyor during transport, and (ii) guide the at least one item along the conveyor when the item is unloaded toward a first end of the conveyor.

6. The shuttle of claim 5, wherein the conveyor is a bi-directional conveyor, the shuttle further comprising:
a third gate portion having the second width, the third gate portion configured to rotate towards the first edge of the conveyor; and
a fourth gate portion having the second width, the fourth gate portion configured to rotate towards the second edge of the conveyor, wherein the third gate portion and the fourth gate portion are disposed at a second side of the conveyor;
wherein the third gate portion and the fourth gate portion are configured to: (i) secure the at least one item on the conveyor during transport, and (ii) guide the at least one item along the conveyor when the item is unloaded toward a second end of the conveyor.

7. The shuttle of claim 5, wherein the first gate portion is positioned a first distance from the first end of the conveyor, and wherein the first distance is substantially equal to the second width.

8. The shuttle of claim 5, wherein the first gate portion and the second gate portion are in a closed position during item transport, and the first gate portion and the second gate portion are in an open position to form guiderails during item unloading.

9. The shuttle of claim 6, wherein the shuttle further comprises:
a first actuator configured to actuate the first gate portion, the second gate portion, the third gate portion, and the fourth gate portion.

10. The shuttle of claim 9, wherein the shuttle further comprises:
a second actuator configured to actuate the conveyor;
wherein the conveyor and the first gate portion, the second gate portion, the third gate portion, and the fourth gate portion are actuated at a same time.

11. The shuttle of claim 5, wherein the shuttle further comprises:
a first actuator configured to actuate the conveyor, the first gate portion, and the second gate portion.

12. The shuttle of claim 5, wherein the shuttle further comprises:
a latch configured to secure the first gate portion and the second gate portion together in a closed position.

13. The shuttle of claim 12, wherein the shuttle further comprises:
a sensor configured to detect that the first gate portion and the second gate portion are in the closed position.

14. The shuttle of claim 13, wherein an angle formed between the first gate portion and the second gate portion in the closed position is less than 180 degrees.

15. The shuttle of claim 5, wherein the shuttle does not comprise an onboard power source coupled to the conveyor.

16. A shuttle comprising:
a conveyor having a first length and a first width, wherein the conveyor is a bi-directional conveyor that is configured to support at least one item;
a first gate portion having a second width that is about half the first width, the first gate portion configured to rotate towards a first edge of the conveyor;
a second gate portion having the second width, the second gate portion configured to rotate towards a second edge of the conveyor, wherein the first gate portion and the second gate portion are disposed at a first side of the conveyor;
a third gate portion having the second width, the third gate portion configured to rotate towards the first edge of the conveyor; and
a fourth gate portion having the second width, the fourth gate portion configured to rotate towards the second edge of the conveyor, wherein the third gate portion and the fourth gate portion are disposed at a second side of the conveyor.

17. The shuttle of claim 16, wherein the first gate portion, the second gate portion, the third gate portion, and the fourth gate portion are configured to: (i) secure the at least one item on the conveyor during transport, and (ii) guide the at least one item along the conveyor when the item is unloaded.

18. The shuttle of claim 16, wherein the first gate portion is positioned a first distance from a first end of the conveyor, and wherein the first distance is substantially equal to the second width.

19. The shuttle of claim 16, wherein the first gate portion and the second gate portion are in a closed position during item transport, and the first gate portion and the second gate portion are in an open position to form guiderails during item unloading.

20. The shuttle of claim 16, further comprising:
a first actuator configured to actuate the first gate portion, the second gate portion, the third gate portion, and the fourth gate portion; and
a second actuator configured to actuate the conveyor;
wherein the conveyor and the first gate portion, the second gate portion, the third gate portion, and the fourth gate portion are actuated at a same time.

\* \* \* \* \*